United States Patent [19]

Hitomi et al.

[11] Patent Number: 5,683,051
[45] Date of Patent: Nov. 4, 1997

[54] SPINNING REEL WITH REMOVABLE MASTER GEAR COVER UNIT

[75] Inventors: Yasuhiro Hitomi, Hashimoto; Seiichi Aratake, Izumi; Kenichi Sugahara, Sakai, all of Japan

[73] Assignee: Shimano Inc., Osaka, Japan

[21] Appl. No.: 662,992

[22] Filed: Jun. 13, 1996

[30] Foreign Application Priority Data

Jun. 30, 1995 [JP] Japan .................. 7-165580

[51] Int. Cl.$^6$ .................. A01K 89/01
[52] U.S. Cl. .................. 242/311; 242/312
[58] Field of Search .................. 242/311, 312

[56] References Cited

U.S. PATENT DOCUMENTS

| | | |
|---|---|---|
| 2,775,417 | 12/1956 | Freund . |
| 5,443,571 | 8/1995 | Kang .................. 242/311 |
| 5,476,230 | 12/1995 | Yamaguchi .................. 242/311 |
| 5,540,397 | 7/1996 | Yoshikawa .................. 242/311 |

FOREIGN PATENT DOCUMENTS

| | | |
|---|---|---|
| 1109402 | 1/1956 | France . |
| 1374520 | 1/1965 | France . |
| 2264852 | 9/1993 | United Kingdom . |

Primary Examiner—Katherine Matecki
Attorney, Agent, or Firm—Jeffer, Mangels, Butler & Marmaro LLP

[57] ABSTRACT

A spinning reel includes a reel body unit having an opening; a rotor that covers a part of the space above the opening in the reel body unit; a master gear that is removable from the opening in the reel body unit; a first cover unit that blocks a part of the opening in the reel body unit without overlapping with the rotor and is removable from the opening; and a second cover unit that blocks the remaining part of the opening not blocked by the first cover unit. The second cover unit is movable to a non-blocking position which permits the master gear to be removed from the opening in the reel body unit.

28 Claims, 13 Drawing Sheets

SPINNING REEL WITH REMOVABLE MASTER GEAR COVER UNIT

FIELD OF THE INVENTION

The present invention relates to a spinning reel.

BACKGROUND OF THE INVENTION

A spinning reel generally comes with a reel body unit, a rotor that is rotatably supported on the reel body unit, and a spool around the outside of which is wound fishing line.

A handle and a handle shaft that are used to rotate the rotor are mounted on the reel body unit, and a master gear comprising a face gear is fixed to the handle shaft. This master gear meshes with a pinion gear, and the tip of the pinion gear is fixed to the rotor. Meanwhile, a threaded shaft is provided to the reel body unit along the rotational axis of the rotor, and an intermediate gear is fixed to one end of this threaded shaft. The intermediate gear meshes with the pinion gear. Also, a slider that is fixed to the spool shaft is stopped by the threaded shaft, and when the threaded shaft rotates, the slider moves back and forth along with the spool shaft. The rotor has a pair of arms, and a bale and a line roller that are used to guide the fishing line around the outside of the spool are provided between the arms.

With a spinning reel such as this, the rotational operation of the handle rotates the rotor and causes the spool to move back and forth, resulting in the fishing line being uniformly wound around the outside of the spool.

The master gear of a spinning reel is an extremely important part in the operation of the spinning reel, including the rotation of the rotor and the reciprocal motion of the spool. In view of this, the master gear must be replaced if it wears down or is damaged.

To this end, it has been devised to provide an opening that allows the extraction of the master gear to the reel body unit, and to cover this opening with a removable cover. The end of the handle shaft to which the master gear is fixed is rotatably supported by this cover.

However, using a single cover to cover the entire opening that is wide enough to allow the extraction of the master gear is a problem in that the removal and attachment of the cover are difficult.

In an effort to make a spinning reel more compact and to increase its operating efficiency, the master gear is positioned in the space inside the rotor or at a location close to this space. If the master gear is positioned in the space inside the rotor or at a location close to this space, then the opening that is used to extract the master gear, and the cover for this opening, also end up being positioned in the space inside the rotor. A cover that is located in the space inside the rotor cannot be easily removed unless the rotor is removed. Removal of the cover requires that the cover be pulled out along the axial direction of the handle shaft supported by the cover, at which point the cover snags on the rotor and cannot be extracted.

However, a lot of work is involved in taking apart and removing the rotor every time the master gear has to be replaced.

A need exists for a spinning reel which permits easy replacement of the master gear while the rotor is still attached to the reel body unit.

SUMMARY OF THE PREFERRED EMBODIMENTS

In accordance with one aspect of the present invention, there is provided a spinning reel comprising a reel body unit, a handle shaft, a spool, a rotor, a master gear, a cover unit, and a flange-shaped cover. The reel body unit has an opening at one end and is mounted on a fishing rod. The handle shaft is rotatably supported on the reel body unit. The spool is reciprocatably supported on the reel body unit, and fishing line can be wound around the outside of the spool. The rotor is rotatably supported on the reel body unit, is adapted to guide a fishing line to the outer periphery of the spool, and covers a part of the space above the opening in the reel body unit. The master gear is housed in the reel body unit, is fixed to the handle shaft and rotates the rotor, and is removable from the opening in the reel body unit. The cover unit blocks a part of the opening in the reel body unit to the extent that there is no overlap with the rotor, rotatably supports one end of the handle shaft, and can be removed from the opening. The flange-shaped cover blocks the remaining opening not blocked by the cover unit, and is movable to a position (e.g., can be arranged in a retracted state) which permits the master gear to be removed from the opening.

According to this embodiment, when the handle shaft is rotated, the rotational force thereof is transmitted to the master gear via the rotor. The rotation of the rotor results in the fishing line being wound onto the reel unit. The opening that is used to take the master gear out of the reel body unit is blocked by the cover unit and the flange-shaped cover.

The first step in taking the master gear out of the reel body unit is to take the cover unit out along the axial direction of the handle shaft (i.e., in a direction approximately normal to the master gear). Since the cover unit blocks part of the opening to the extent that there is no overlap with the rotor, it can be taken out along the handle shaft.

Next, the flange-shaped cover is moved from a position in which it blocks the opening along with the cover unit to another, non-blocking position (e.g., a retracted state). The master gear then can be taken out from the opening along the axial direction of the handle shaft.

Having the opening covered by two members, namely, the cover unit and the flange-shaped cover, allows the master gear to be replaced with ease without having to take apart the rotor. This allows the maintenance and repair of the spinning reel to be performed quickly and simply.

In a preferred embodiment of the inventive spinning reel, the non-blocking position is a position in which the flange-shaped cover has been removed from the reel body unit. This preferred embodiment permits the removal of the master gear to be carried out in a state in which both the cover unit and the flange-shaped cover have been taken out of the opening, which makes the work easier. There is no possibility whatsoever of the flange-shaped cover interfering with the removal of the master gear.

In another preferred embodiment, the flange-shaped cover is stopped by the reel body unit in the non-blocking position, which is a retracted state. Since the flange-shaped cover is stopped by the reel body unit in the retracted state, it is easy to return the flange-shaped cover to its original location after the master gear has been replaced. There is thus no need to store the removed flange-shaped cover. Furthermore, the work of returning the flange-shaped cover from its retracted state to its specified attachment location can be performed with ease, so the replacement of the master gear is facilitated.

In still another preferred embodiment, the flange-shaped cover is engaged with the reel body unit slidably toward the center of the opening from a position in which it blocks the opening. Thus, the flange-shaped cover can be removed from the reel body unit in the center of the opening. There is also a fixing means for fixing the flange-shaped cover by blocking the opening with the cover unit in a position in which the opening has been blocked with the flange-shaped cover.

In this embodiment, the flange-shaped cover is taken out after being slid toward the center of the opening, which allows the flange-shaped cover to be taken out easily without it snagging on the rotor that covers the upper part of the flange-shaped cover. Again in the removal of the flange-shaped cover, if it is returned to its original position by being slid from the center of the opening, then the flange-shaped cover can be properly attached in its original position even on the inside of the rotor. Since there is a fixing means for fixing the flange-shaped cover by blocking the opening with the cover unit, the labor and the mechanism for fixing the flange-shaped cover and the cover unit separately are eliminated. Even though the member that blocks the opening is divided into the flange-shaped cover and the cover unit, attachment, fixing, and removal are no trouble, and these parts are easy to handle.

In a further preferred embodiment, the flange-shaped cover is retractable from the opening and is engaged with the reel body unit such that it is adapted for revolving motion about a first point on the periphery of the opening to move between a retracted position and a position in which it partially blocks the opening. The reel further includes stopping means for stopping the flange-shaped cover on the reel body unit upon revolving motion of the flange-shaped cover toward the opening. An axis of revolution is defined through the first point, and the flange-shaped cover optionally is movable in the direction of the axis of revolution.

In this embodiment, operation is simple since it is possible to switch between the retracted position and a position in which the opening is blocked by the rotational operation of the flange-shaped cover. Also, since there is a stopping means for stopping the flange-shaped cover on the reel body unit, the flange-shaped cover can be properly positioned in the specified location. Since the above-mentioned revolution and the movement in the axial direction of the revolution can be carried out in a series of operations, movement and positioning can be carried out simply and properly.

In accordance with another aspect of the present invention, there is provided a spinning reel including a reel body unit having an opening; a rotor that covers a part of the space above the opening in the reel body unit; a master gear that is removable from the opening of the reel body unit; a first cover unit that blocks a part of the opening in the reel body unit without overlapping with the rotor and is removable from the opening; and a second cover unit that blocks the remaining part of the opening not blocked by the first cover unit, and is movable to a non-blocking position which permits the master gear to be removed from the opening.

In accordance with a further aspect of the present invention, there is provided a method for removing a master gear from a spinning reel, the spinning reel including a reel body unit having an opening, a rotor that covers a part of the space above the opening in the reel body unit, a master gear that is removable from the opening of the reel body unit, a first cover unit that blocks a part of the opening in the reel body unit without overlapping with the rotor and is removable from the opening, and a second cover unit that blocks the remaining part of the opening not blocked by the first cover unit, and is movable to a non-blocking position which permits the master gear to be removed from the opening. The method includes the steps of removing the first cover unit from the reel; moving the second cover unit to the non-blocking position; and removing the master gear from the reel body unit through the opening.

In accordance with still another aspect of the present invention, there is provided a method for making a spinning reel, the spinning reel including a reel body unit having an opening, a rotor that covers a part of the space above the opening in the reel body unit, and a master gear. The method includes the step of blocking the opening of the reel body unit by fixing to the reel body unit a first cover unit that blocks a part of the opening in the reel body unit without overlapping with the rotor and is removable from the opening, and a second cover unit that blocks the remaining part of the opening not blocked by the first cover unit and is movable to a non-blocking position which permits the master gear to be removed from the opening. In the method, the second cover unit is fixed to the reel body unit prior to fixing the first cover unit to the reel body unit.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which.

DETAILED DESCRIPTION OF THE PREFERRED EMBODIMENTS

Overall Structure

The spinning reel pertaining to the practical example of the present invention shown in FIGS. 1 through 5 comprises a reel body unit 2 equipped with a handle 1, a rotor 3 rotatably supported at the front of the reel body unit 2, and a spool 4 that is positioned at the front of the rotor 3 and winds the fishing line.

Figure 3:
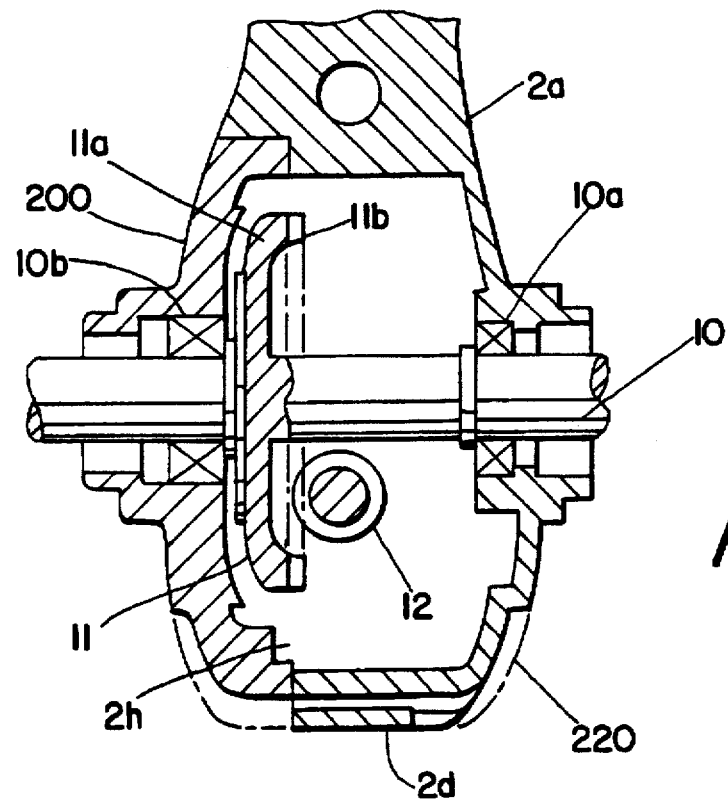
FIG. 3 is a cross section of the master gear attachment portion along line 3—3 in FIG. 2.
Figure 5:
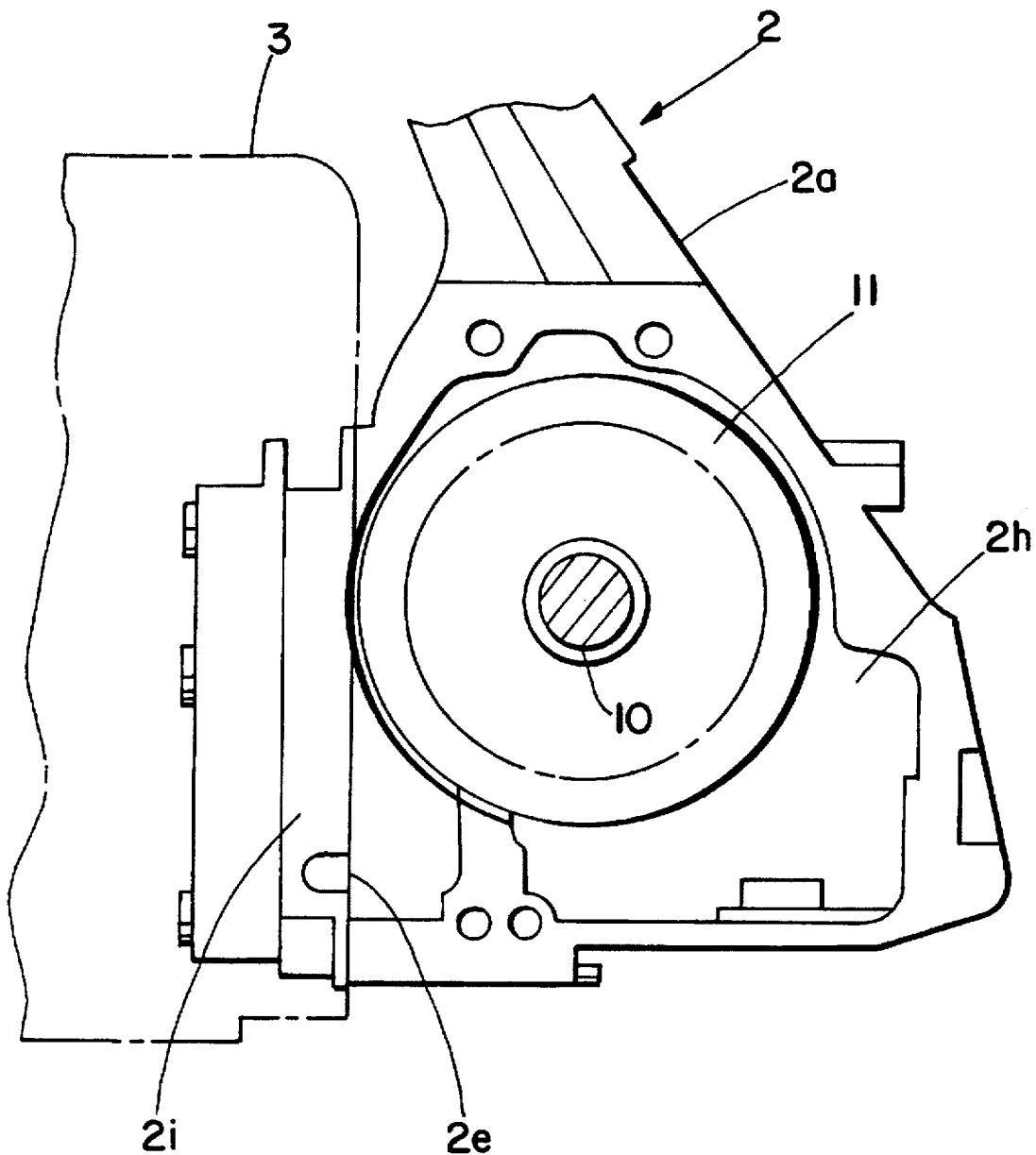
FIG. 5 is a front view of the reel body unit after the cover unit and the flange-shaped cover have been removed.

The reel body unit 2 has a body 2a, on the upper portion of which is formed an attachment component 2b that is used to attach the spinning reel to the fishing rod. The interior of the body 2a is provided with a rotor drive mechanism 5 that is used to rotate the rotor 3, and a level winding mechanism 6 (reciprocal motion mechanism) that is used to move the spool 4 back and forth along the rotational axis X and uniformly wind the fishing line around the spool 4. As shown in FIGS. 3 and 5, there is an opening 2h on one side of the body 2a, and this opening 2h is blocked by a first cover unit, here cover unit 200 and a second cover unit, here a flange-shaped cover 210.

Structure of the Rotor Drive Mechanism

The rotor drive mechanism 5 has a master gear 11 that rotates along with the handle shaft 10 to which the handle 1 is fixed, and a pinion gear 12 that meshes with this master gear 11. The handle shaft 10 is rotatably supported on the reel body unit 2.

Figure 1:
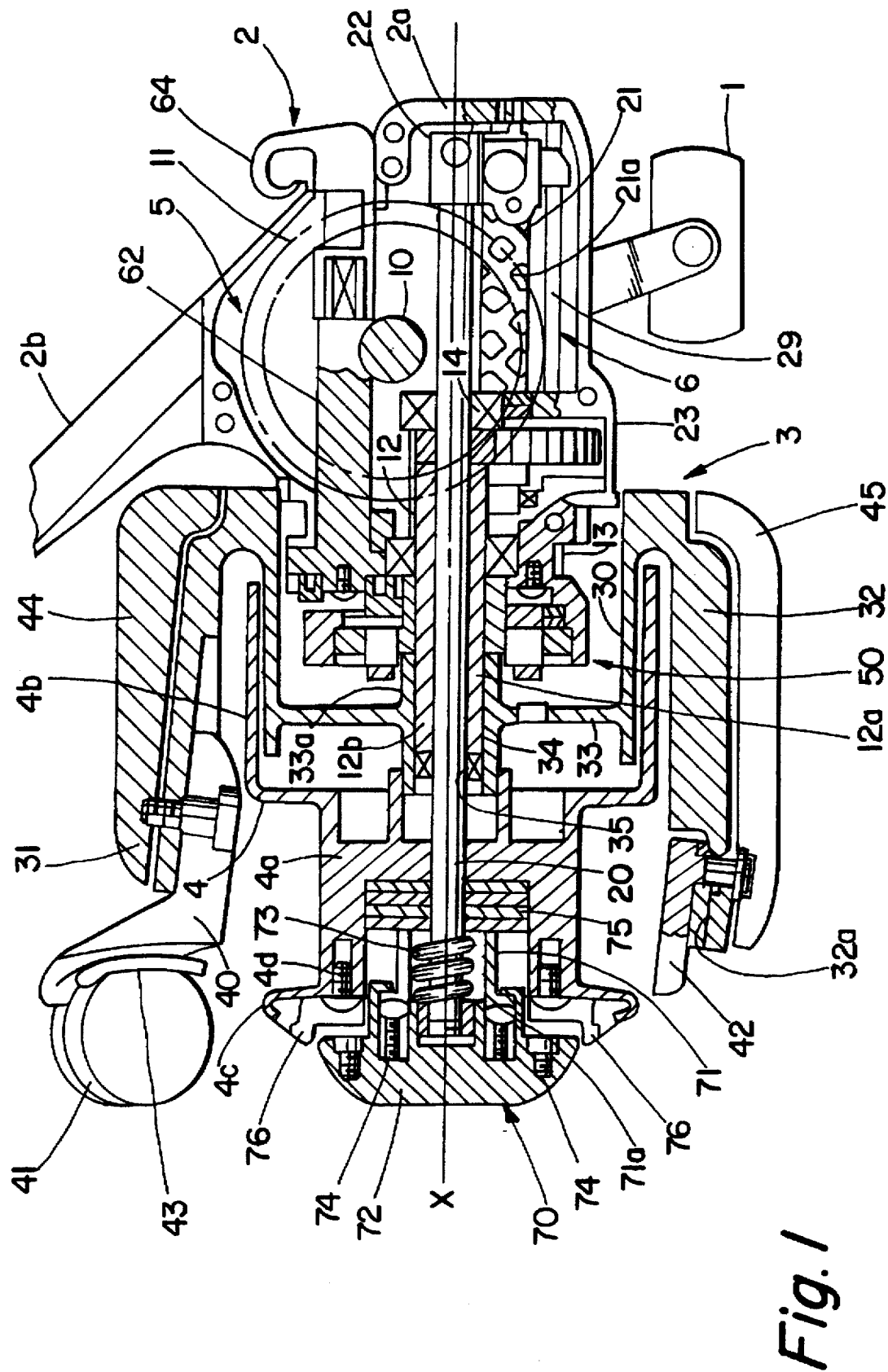
FIG. 1 is a cross section of the overall structure of a spinning reel that illustrates a first embodiment of the present invention.

As shown in FIGS. 1 and 3, the master gear 11 has a disk-shaped body 11a that is integrally molded with the handle shaft 10, and a tooth member 11b formed around the outside of one side wall of the body 11a. The tooth member 11b protrudes in the axial direction of the handle shaft 10. The handle shaft 10 is rotatably supported via bearings 10a and 10b by the body 2a and the cover unit 200. A handle is attached to the handle shaft 10 on the outside of the reel body unit 2. As shown in FIGS. 3 and 5, the opening 2h in the body 2a is larger than the external size of the master gear 11.

The pinion gear 12 is formed in a cylinder, and the front 12a thereof extends through the center of the rotor 3 to the spool 4 side. In the tip thereof is formed a threaded member 12b. As is clear from FIGS. 1 and 3, the positioning of the pinion gear 12 is offset by a specific distance downward with respect to the master gear 11, and the middle portion and rear end portion in the axial direction thereof are rotatably supported by the reel body unit 2 via roller bearings 13 and 14, respectively. The roller bearing 14 that supports the rear end of the pinion gear 12 is located inside the body of the master gear 11.

Structure of the Cover

Figure 2:
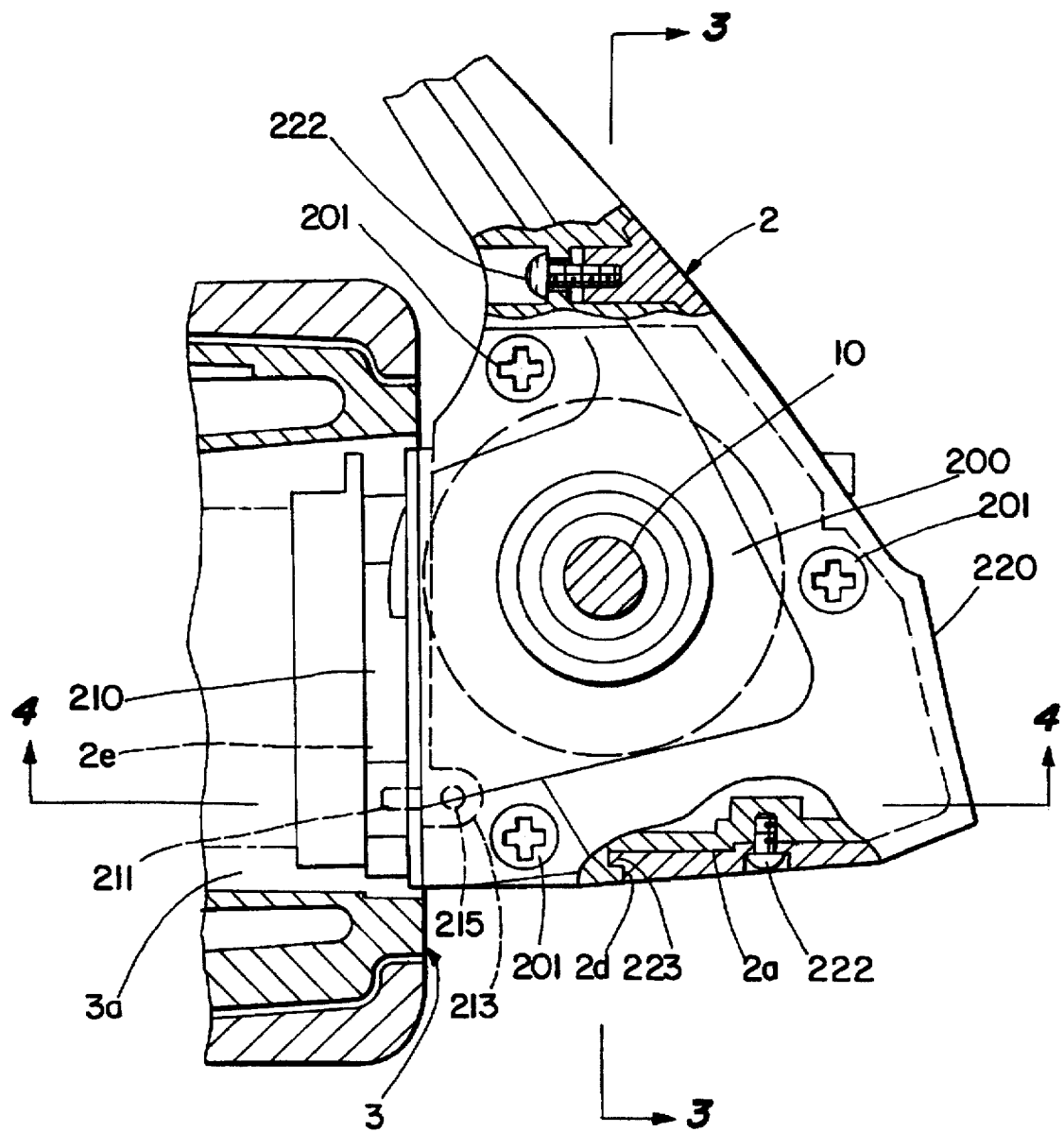
FIG. 2 is a front view of a partial cross section that illustrates the master gear attachment portion.
Figure 4:
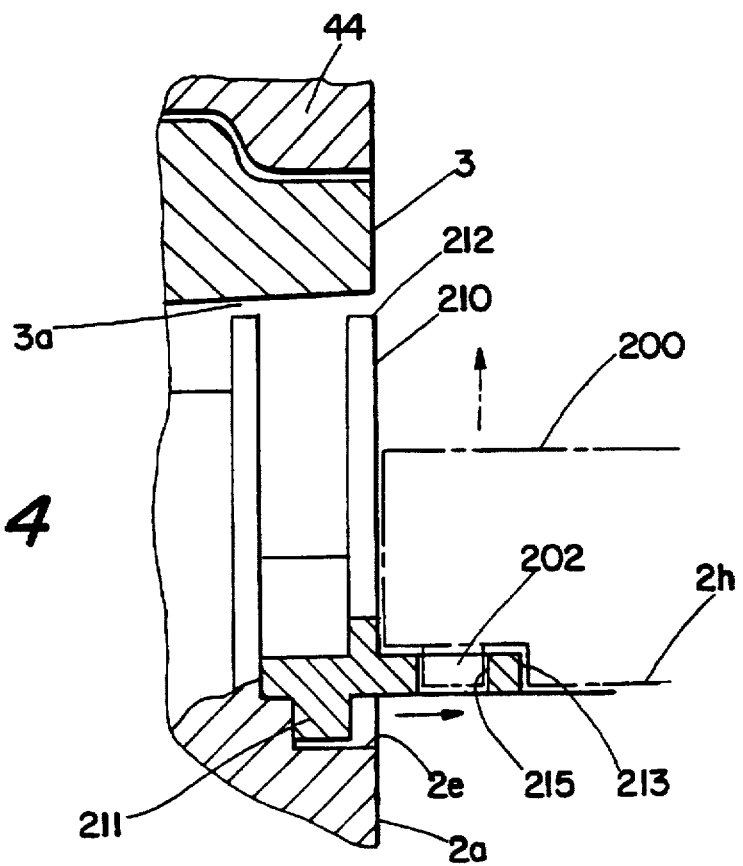
FIG. 4 is a cross section along line 4—4 in FIG. 2 of the main components that illustrates the attachment portion of the flange-shaped cover.

As shown in FIGS. 2 and 3, the cover unit 200 is fixed and attached to the body 2a at a plurality of locations by screws 201. As shown in FIG. 4, the cover unit 200 is positioned outside of the lateral end face in the axial direction of the rotor 3.

A nameplate cover 220 is attached so that it covers part of the cover unit 200 attached to the body 2a. The nameplate cover 220 is printed or engraved with the model name or number or other such characters or symbols. The nameplate cover 220 is fitted in place so that it covers the body 2a and the cover unit 200. There is an engagement protrusion 2d on the lower surface of the body 2a, and an engagement member 223 had by the nameplate cover 220 is engaged with this engagement protrusion 2d. The nameplate cover 220 is fixed to the body 2a at a plurality of locations by screws 222. The nameplate cover 220 can be attached to the reel body unit 2 easily and properly by using the above-mentioned fixing mechanism that employs the screws 222, and the engagement mechanism that employs the engagement protrusion 2d and the engagement member 223.

As shown in FIGS. 2 and 4, the flange-shaped cover 210 is positioned such that nearly all of it blocks the forward portion of the opening 2h of the body 2a that is in the inside space 3a of the rotor 3, and such that it covers part of the upper portion of the master gear 11 housed inside the opening 2h. A function of the flange-shaped cover 210 is to prevent the infiltration of foreign matter and the like into the rotor 3 by blocking the space between the body 2a and the inner surface of the rotor 3 with the edge 212 that extends around the outer periphery of the flange-shaped cover 210. For this reason as well, the flange-shaped cover 210 must be positioned in the internal space of the rotor 3.

As shown in FIG. 4, there is a sliding protrusion 211 on one end of the lower surface of the flange-shaped cover 210, and this is slidably fitted into a sliding groove 2e provided to the surface of the body 2a. The sliding groove 2e extends from inside the rotor 3 (within space 3a) toward the opening 2h in the body 2a, and the end of the sliding groove 2e is connected to the opening 2h. Therefore, the sliding protrusion 211 of the flange-shaped cover 210 moved through the sliding groove 2e from inside the rotor 3 to the opening 2h to allow the flange-shaped cover 210 to be taken out of the opening 2h.

There is a fixing piece 213 that protrudes toward the opening 2h on that lateral end face of flange-shaped cover 210 that is adjacent to the sliding protrusion 211 and is in contact with the cover unit 200. A fixing hole 215 is made at some point along the fixing piece 213.

The cover unit 200 is attached so as to cover the fixing piece 213 of the flange-shaped cover 210, and on the lower surface of the cover unit 200 there is a fixing pin 202 that fits into the fixing hole 215 of the flange-shaped cover 210.

Removal and Attachment of Master Gear

To remove the master gear 11 from the reel body unit 2, the cover unit 200, the flange-shaped cover 210, and the nameplate cover 220 must be removed.

The nameplate cover 220 can be easily removed once the screws 222 are backed out and the engagement member 223 is disengaged from the engagement protrusion 2d of the body 2a.

Next, the cover unit 200 is removed from the opening 2h. Once the screws 201 that fix the cover unit 200 are removed, the cover unit 200 is pulled straight out along the axial direction of the handle shaft 10, as shown in FIG. 4. The cover unit 200 can be removed smoothly, without snagging on the rotor 3.

The sliding protrusion 211 of the flange-shaped cover 210 is then moved along the sliding groove 2e of the body 2a, and the flange-shaped cover 210 is pulled from the internal space of the rotor 3 toward the opening 2h. Once the flange-shaped cover 210 has been pulled toward the opening 2h, it can be removed from the body 2a without snagging on the rotor 3.

As shown in FIG. 5, the master gear 11 can be removed once it has been pulled along the axial direction of the handle shaft 10 from the opening 2h in the body 2a in a state in which the cover unit 200, the flange-shaped cover 210, and the nameplate cover 220 have been removed.

In the reassembly of the reel body unit 2, the master gear 11 is put back into the opening 2h. Next, the flange-shaped cover 210 is attached. The flange-shaped cover 210 is inserted from the opening 2h toward the rotor 3 side atop mounting ledge 2i, and the sliding protrusion 211 of the flange-shaped cover 210 is fitted into the sliding groove 2e of the body 2a and slid inward. When the sliding protrusion 211 hits the back of the sliding groove 2e, the flange-shaped cover 210 is positioned at its specified attachment location. The cover unit 200 is attached from above the flange-shaped cover 210. The cover unit 200 is placed over the handle shaft 10 via the bearing 10a, and the fixing pin 202 of the cover unit 200 is fitted into the fixing hole 215 of the flange-shaped cover 210, at which point the cover unit 200 is attached to the body 2a and the flange-shaped cover 210 is positioned. The cover unit 200 is fixed to the body 2a by the screws 201. After this, the nameplate cover 220 is attached to complete the assembly of the reel body unit 2.

Structure of the Level Winding Mechanism

The level winding mechanism 6 is a mechanism for moving the spool shaft 20 fixed in the center of the spool 4 back and forth so that the spool 4 moves in the same direction. The level winding mechanism 6 has a threaded shaft 21 located below the spool shaft 20, a slider 22 that moves back and forth along the threaded shaft 21, and an intermediate gear 23 that is fixed to the tip of the threaded shaft 21. The threaded shaft 21 is positioned in parallel with the spool shaft 20, and is rotatably supported by the body 2a. A spiral groove 21a is formed around the outside of the threaded shaft 21. The rear end of the spool shaft 20 is fixed to the slider 22. The intermediate gear 23 meshes with the pinion gear 12. The rotation of the pinion gear 12 is transmitted from the intermediate gear 23 to the threaded shaft 21, the slider 22 slides along the spiral groove 21a, and the spool shaft 20 is moved back and forth.

Structure of the Rotor

The rotor 3 has a cylinder 30, and a first arm 31 and a second arm 32 provided opposite each other on the sides of the cylinder 30. The cylinder 30 and the arms 31 and 32 are integrally molded.

A forward wall 33 is formed at the front of the cylinder 30, and a boss 33a is formed in the center of the forward wall 33. A through-hole 33b is formed in the center of the boss 33a, and the spool shaft 20 and the front 12a of the pinion gear 12 pass through this through-hole. A nut 34 is positioned at the front of the forward wall 33, and this nut 34 is threaded onto the tip threads (threaded member 12a) of the pinion gear 12. A bearing 35 that rotatably supports the spool shaft 20 is positioned around the inside of the nut 34.

A first bale support member 40 is swingably attached around the inside of the tip of the first arm 31. A line roller 41 that is used to guide the fishing line to the spool 4 is mounted on the tip of the first bale support member 40. A second bale support member 42 is swingably mounted around the inside of the tip of the second arm 32. A bale 43 is provided between the second bale support member 42 and the line roller 41 on the tip of the first bale support member 40. Covers 44 and 45 are attached around the outside of the arms 31 and 32, respectively.

An anti-reversal mechanism 50 for the rotor 3 is positioned on the inside of the cylinder 30 of the rotor 3. The anti-reversal mechanism 50 has a roller type of one-way clutch and a control mechanism for controlling this one-way clutch. As shown in FIG. 1, the operating mechanism has a control rod 62 and a control lever 64 that is linked to the rear end of the control rod 62.

Structure of the Spool

The spool 4 is positioned between the first arm 31 and the second arm 32 of the rotor 3, and is mounted on the tip of the spool shaft 20 via a drag mechanism 70. The spool 4 has a line winding drum 4a around the outside of which is wound the fishing line, a skirt 4b that is integrally molded at the rear of the line winding drum 4a, and a flange plate 4c that is fixed to the front end of the line winding drum 4a. The flange plate 4c preferably is molded from a sheet of stainless steel, and is mounted on the line winding drum 4a by screws 4d.

Structure of the Draft Mechanism

The drag mechanism 70 has a pressing member 71 that is pressed against the interior front end of the spool 4, an adjustment knob 72 for adjusting the drag force, a pressing spring 73 positioned between the pressing member 71 and the adjustment knob 72, and a plurality of clutch plates 75 positioned between the pressing member 71 and the spool 4. With a structure such as this, the pressing force of the pressing member 71 against the spool 4 can be adjusted by adjusting the amount of tightening of the adjustment knob 72, and this allows the drag force to be adjusted.

A clicking sound generating mechanism is provided to the drag mechanism 70. This mechanism has a plurality of grooves 71a formed on the front end of the pressing member 71, a pair of pins 76 provided slidably along the axial direction of the adjustment knob 72, and a spring 74 that is used to energize the pair of pins 76 in the grooves 71a. With this clicking sound generating mechanism, a clicking sensation is imparted to the user when the adjustment knob 72 is turned.

Control and Operation of the Reel

During casting, the bale 43 is flipped over to the line release attitude side. When the fishing rod is then flicked, the fishing line wound around the outside of the spool 4 is played out.

When the fishing line is reeled in, the bale 43 is flipped over to the line winding attitude side. When the handle 1 is rotated in this state, this rotational force is transmitted to the pinion gear 12 via the handle shaft 10 and the master gear 11. This rotational force transmitted to the pinion gear 12 is transmitted to the rotor 3 via the pinion gear front 12a.

Meanwhile, the threaded shaft 21 is rotated by the intermediate gear 23 that meshes with the pinion gear 12, and the slider 22 that meshes with the groove 21 of this threaded shaft 21 is guided to the guide shafts 28 and 29 and moves back and forth. Accordingly, the spool shaft 20 and the spool 4 move back and forth along the rotational axis X, and the fishing line guided to the spool 4 by the bale 45 and the line roller 41 is uniformly wound back and forth around the outside of the spool 4.

Figure 6:
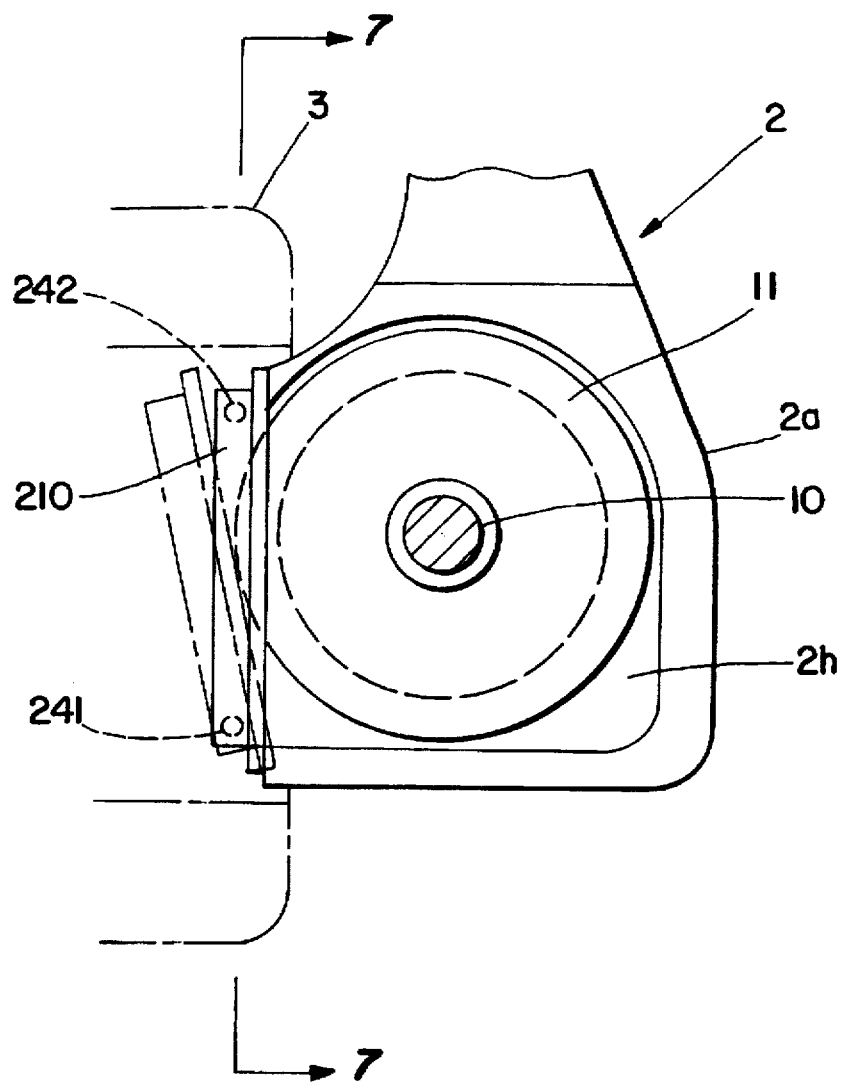
FIG. 6 is a front view of the flange-shaped cover portion that illustrates another preferred embodiment.
Figure 7:
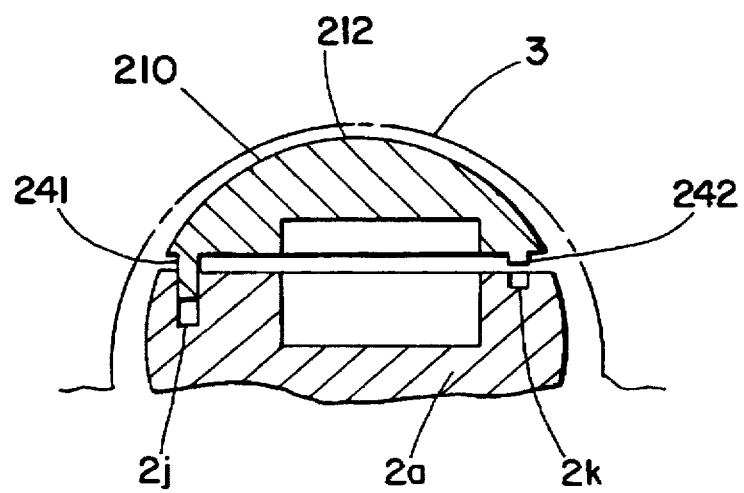
FIG. 7 is a cross section along line 7—7 in FIG. 6 of the flange-shaped cover portion in the embodiment in FIG. 6.

Other examples of the first and second cover units of the invention are shown in FIGS. 6–10. As shown in FIGS. 6 and 7, there is a relatively long revolving pin 241 on the lower surface at one end of the flange-shaped cover 210, and there is a relatively short stationary pin 242 on the lower surface at the other end. On the surface of the body 2a there are a revolution hole 2j into which the revolving pin 241 is revolvably fitted and which is slidable in the axial direction, and a stationary hole 2k into which the stationary pin 242 is fitted.

As shown in FIG. 7, when the flange-shaped cover 210 is lifted slightly from the surface of the body 2a in a state in which the revolving pin 241 of the flange-shaped cover 210 has been fitted into the revolution hole 2j of the body 2a, the stationary pin 242 comes out of the stationary hole 2k. In this state, the flange-shaped cover 210 can move through the revolution of the stationary pin 242 side around the revolving pin 241. If the stationary pin 242 of the flange-shaped cover 210 is stopped by being fitted into the stationary hole 2k of the body 2a, the flange-shaped cover 210 can no longer revolve, and is therefore positioned.

Therefore, in the removal of the master gear 11, the flange-shaped cover 210 is first lifted slightly from the surface of the body 2a so that the stationary pin 242 will come out of the stationary hole 2k. The flange-shaped cover 210 positioned in the internal space of the rotor 3 can be lifted to the extent of the gap between the inner surface of the rotor 3 and the peripheral edge 212 around the outside of the flange-shaped cover 210. In this state, the flange-shaped cover 210 revolves toward the inside of the rotor 3. When this happens, the flange-shaped cover 210, which had been covering part of the upper portion of the master gear 11 at the opening 2h, retracts toward the inside of the rotor 3, which makes it possible to take out the master gear 11.

To put the flange-shaped cover 210 back in an attached state, the flange-shaped cover 210 is revolved toward the opening 2h. Once the revolution reaches a specific location, the stationary pin 242 fits into the stationary hole 2k and is stopped, and the flange-shaped cover 210 is thereby positioned at a specific location where it will cover part of the upper portion of the master gear 11. If the cover unit 200 is attached to the upper portion of the flange-shaped cover 210 to fix the flange-shaped cover 210, then there is no danger of the flange-shaped cover 210 being lifted from the surface of the body 2a.

In this practical example, the flange-shaped cover 210 can be moved to a retracted state while still attached to the body 2a, so there is no need to remove and store the flange-shaped cover 210, and reassembly after the replacement of the master gear 11 is simpler.

Figure 8:
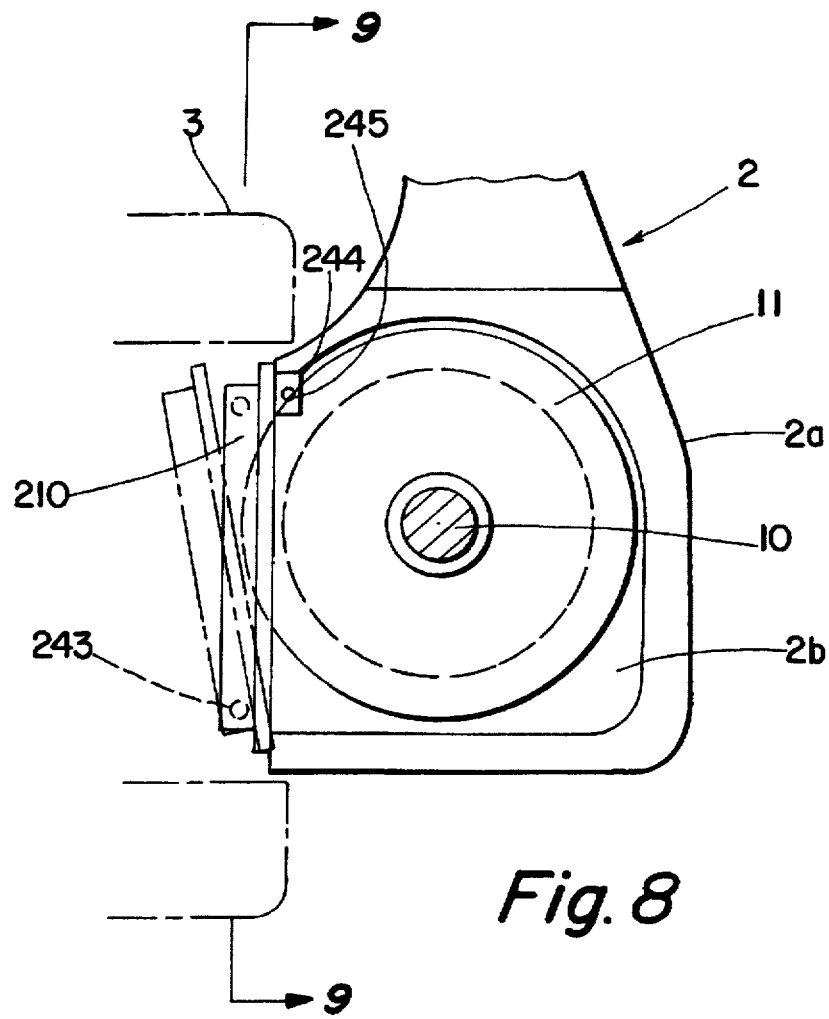
FIG. 8 is a front view of the flange-shaped cover portion that illustrates another preferred embodiment.
Figure 9:
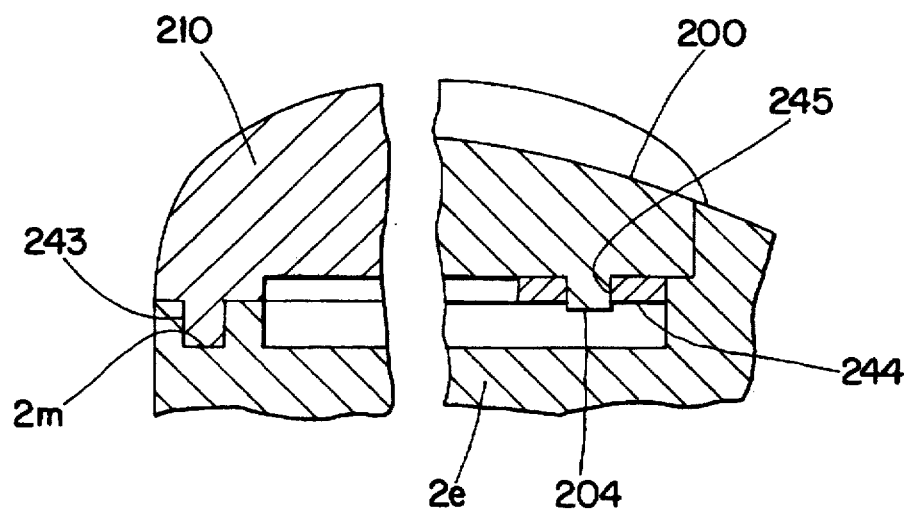
FIG. 9 is a cross section along line 9—9 in FIG. 8 of the flange-shaped cover portion in the embodiment in FIG. 8.

As shown in FIGS. 8 and 9, there is a revolving pin 243 on the lower surface at one end of the flange-shaped cover 210, and there is a stationary piece 244 that protrudes toward the opening 2h side on the lateral end face at the other end. A fixing hole 245 is made through the stationary piece 244. In the surface of the body 2a there is a revolution hole 2m into which the revolving pin 243 is revolvably fitted. On the lower surface of the cover unit 200 there is a fixing pin 204 into which the fixing hole 245 of the flange-shaped cover 210 is fitted.

The fact that the flange-shaped cover 210 revolves around the revolution pin 243 and retracts toward the internal space of the rotor 3 is the same as in the above practical example. When the cover unit 200 is attached in a state in which the flange-shaped cover 210 has been attached so as to cover part of the upper portion of the master gear 11, the fixing pin 204 of the cover unit 200 fits into the fixing hole 245 of the flange-shaped cover 210, which positions and fixes the flange-shaped cover 210.

In this practical example, there is no need for the flange-shaped cover 210 to be lifted from the surface of the body 2a during its revolution, unlike in the above practical example. Instead, the flange-shaped cover 210 is not positioned until the cover unit 200 is attached.

Figure 10:
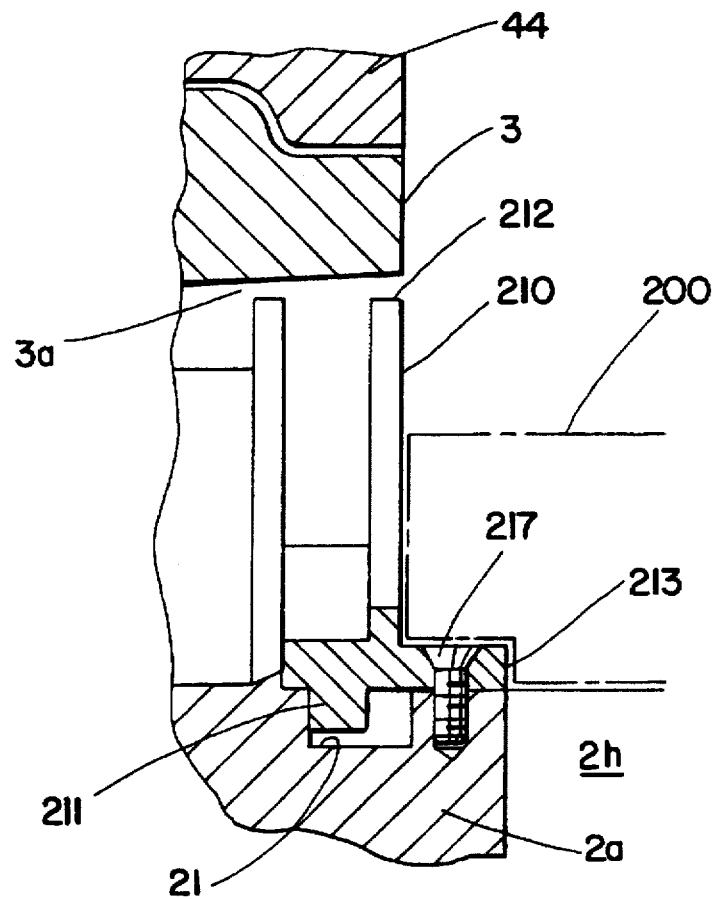
FIG. 10 is a cross section (analogous to FIG. 4) of the main components of the flange-shaped cover that illustrates another preferred embodiment.

As shown in FIG. 10, there is a sliding protrusion 211 that is the same as in the above practical example on the flange-shaped cover 210, and this sliding protrusion 211 is slidably fitted into the sliding groove 2f of the body 2a. The sliding groove 2f does not, however, extend all the way to the lateral end position of the rotor 3, and does not open into the opening 2h. A fixing piece 213 protrudes from the lateral end face of the flange-shaped cover 210. This fixing piece 213 does not protrude as far as the opening 2h, and is positioned on the surface of the body 2a. In a state in which the flange-shaped cover 210 has been positioned at the specified attachment location, the fixing piece 213 is fixed to the body 2a by a screw 217.

In removing the flange-shaped cover 210 from the body 2a, the screw 217 is taken out after the removal of the cover unit 200. The screw 217 is attached to the fixing piece 213 that protrudes further outward than the lateral end of the rotor 3, and the screw 217 can be turned with a screwdriver or other tool without the rotor 3 being removed. Once the screw 217 is removed, the flange-shaped cover 210 can moved from the space inside the rotor 3 toward the opening 2h. Once the peripheral edge 212 that extends around the outside of the flange-shaped cover 210 is outside the rotor 3, then the flange-shaped cover 210 can be lifted upward and away from the body 2a and thus removed. Therefore, the sliding groove 2f should be provided to the extent that the flange-shaped cover 210 can be pulled outside of the rotor 3.

In this practical example, since the flange-shaped cover 210 is fixed by the screw 217, it can be fixed by itself without being held down by the cover unit 200.

When the flange-shaped cover 210 is fixed by the screw 217 as in the above practical example, the screw 217 may fix any portion of the flange-shaped cover 210 as long as it is possible to turn the screw 217.

Alternative Pinion Gear Portion

Figure 11:
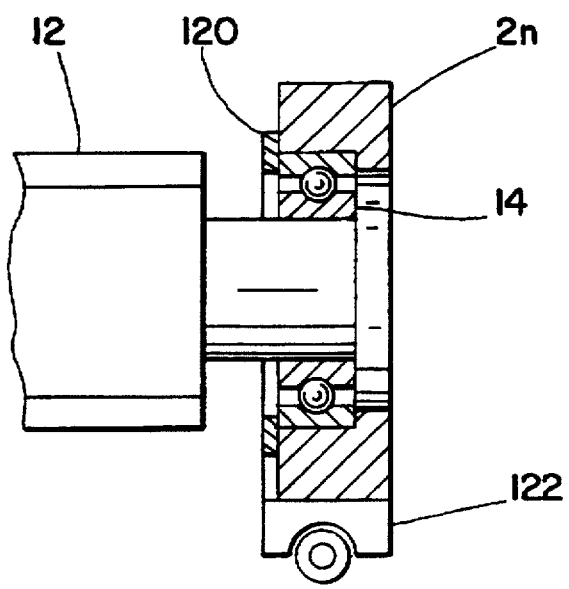
FIG. 11 is a cross section of the main components that illustrates another preferred embodiment of the pinion gear attachment structure.
Figure 12:
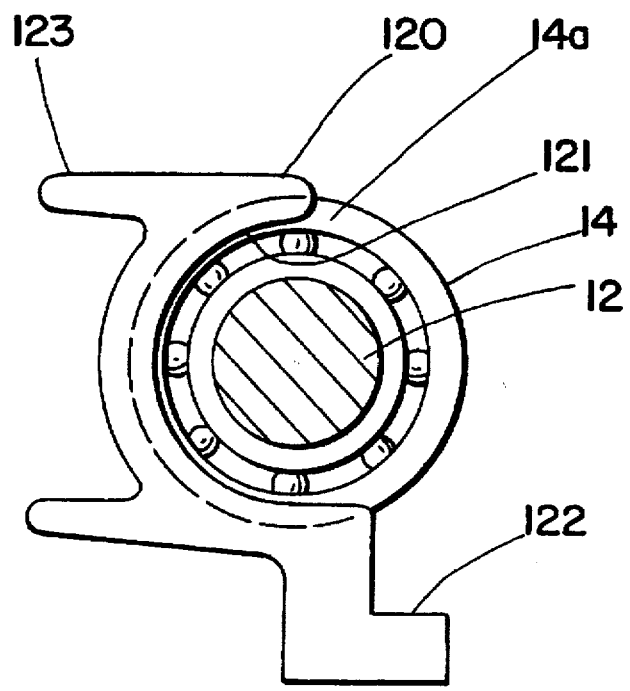
FIG. 12 is a front view of the retainer plate portion viewed from the axial direction in FIG. 11.

As shown in FIGS. 11 and 12, there is a retainer plate 120 at the attachment location of the roller bearing 14 that supports the pinion gear 12 on the handle shaft 10 side. The retainer plate 120 is attached to the bearing housing 2n, which is a fixed structure provided to the body 2a. The retainer plate 120 has a holder ring 121 that is in contact with a so-called outer wheel, that is, the outer peripheral portion 14a, of the roller bearing 14, and an attachment member 122 that is used for attachment to the bearing housing 2n. There is a pair of legs 123 that extend from the holder ring 121 to the bottom of the body 2a, and this design allows the retainer plate 120 to properly hit the specific location of the roller bearing 14.

This retaining means for the roller bearing can also be applied to the other bearings besides the above-mentioned roller bearing 14.

Alternative Drag Mechanisms

Figure 13:
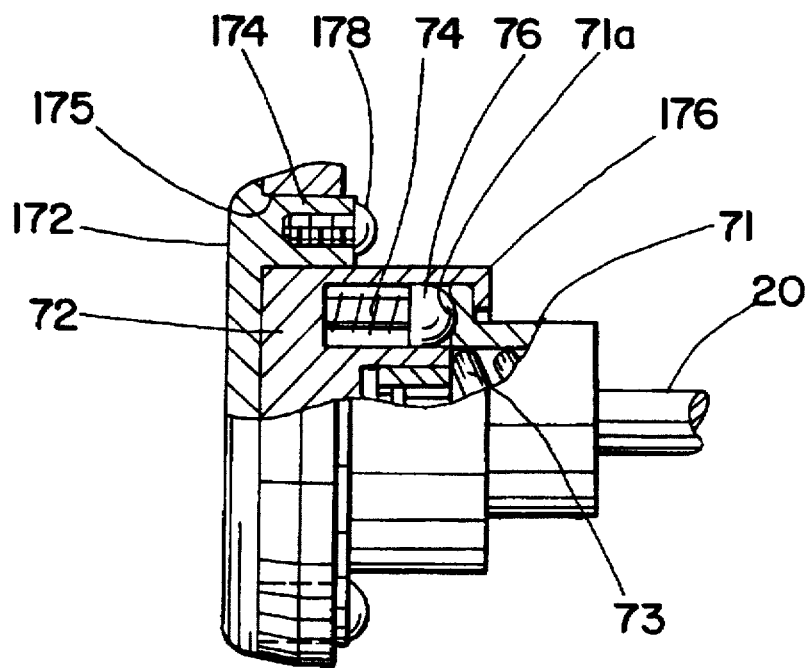
FIG. 13 is a partial cross section that illustrates another preferred embodiment of the drag mechanism.

As shown in FIG. 13, this practical example is the same as the above practical example in terms of comprising a pressing member 71, a adjustment knob 72, a pressing spring 73, a pin 76, a groove 71a, a spring 74, and so on.

In this practical example, a drag nameplate 172 is positioned on the outer surface of the adjustment knob 72. The surface of the drag nameplate 172 is printed or engraved with characters or symbols for drag control instructions or the like. On the drag nameplate 172 there are a plurality of legs 174 in the peripheral direction that protrude toward the adjustment knob 72. The legs 174 are inserted into leg holes 175 provided to the adjustment knob 72, and are exposed on the back side of the drag nameplate 172.

A housing cover 176 that houses the pin 76 and the like along with the pressing member 71 is screwed into and fixed to the legs 174 by screws 178.

With this practical example, since there is a drag nameplate 172 composed of a material other than that of the adjustment knob 72, the drag nameplate 172 can be freely colored or patterned or otherwise labelled, which makes the product more attractive or decorative. Since this drag nameplate 172 is integrally attached by the screws 178 to the housing cover 176 with the adjustment knob 72 sandwiched in between, the attachment work takes less time than when the drag nameplate 172 alone is attached separately.

Figure 14:
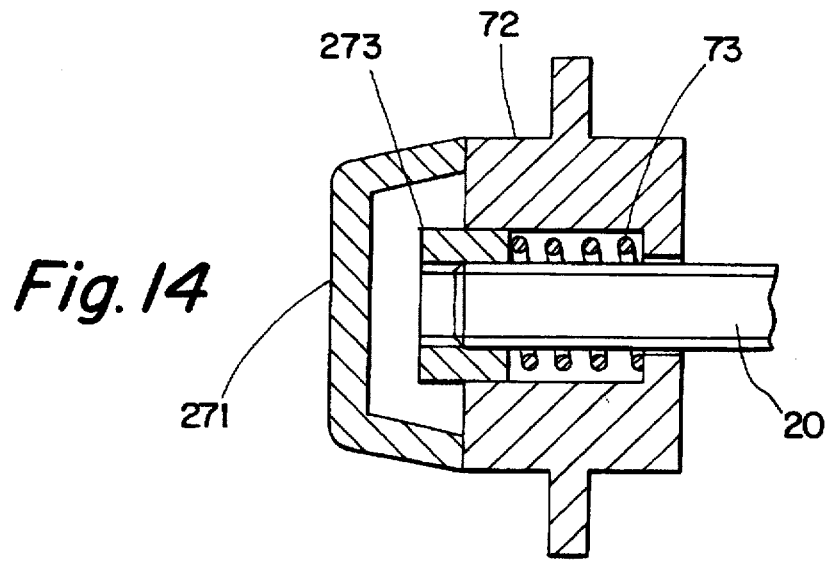
FIG. 14 is a cross section that illustrates another preferred embodiment of the drag mechanism.

As shown in FIG. 14, inside the adjustment knob 72, a drag nut 273 is screwed onto the outside of the pressing spring 73 at the end of the spool shaft 20. The end of the drag nut 173 protrudes outward from the lateral end face of the adjustment knob 72. On the outer surface of the adjustment knob 72 there is a drag nameplate 271 that bulges out in the form of a cap. The end of the drag nut 273 that protrudes from the adjustment knob 72 is positioned in the internal space of the drag nameplate 271.

With this practical example, since the drag nut 273 is housed in the internal space of the drag nameplate 271, the principal structural members of the drag mechanism, such as the adjustment knob 72, can be made more compact. Since the drag nameplate 271 can be molded simply using a synthetic resin or the like, and the manufacturing cost is therefore low, even if the drag nameplate 271 is large, the adjustment knob 72 and other principal structural members can be made more compact and lightweight, which is a major advantage. A variety of decorations and designs can be made by on the outer surface of the drag nameplate 271 that bulges outward, and this allows the appearance to be enhanced.

A clicking sound generating mechanism consisting of the pins 76, the spring 74, and so on is illustrated in FIG. 14, but if needed, the same clicking sound generating mechanism as in the above practical example or other mechanisms necessary for the drag mechanism can also be provided.

Figure 15A:
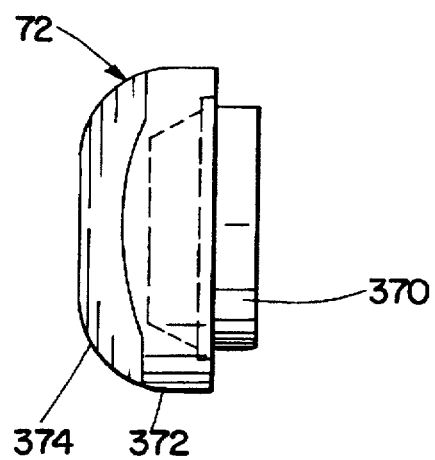
FIGS. 15(a) and 15(b) are a side view and exploded view that illustrate another preferred embodiment of the drag adjustment knob.
Figure 15B:
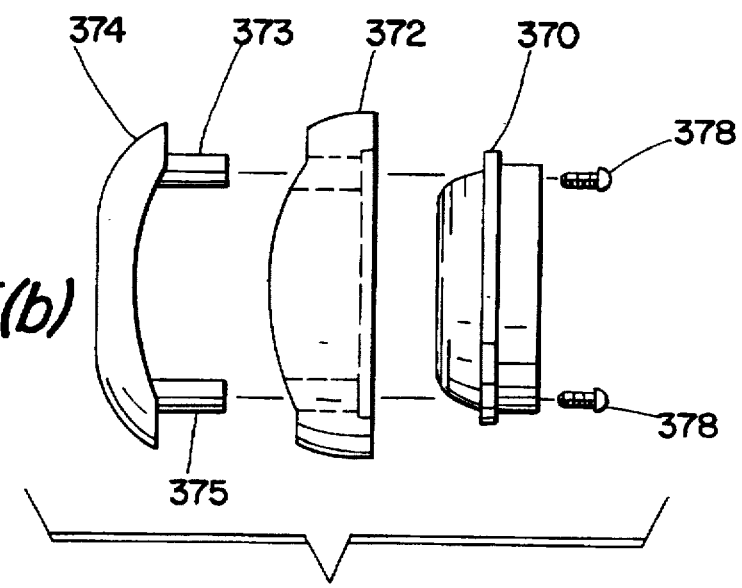

As shown in FIGS. 15a and 15b, the adjustment knob 72 has a function component 370 that houses a clicking sound generating mechanism or other such mechanism parts, a collar 372 that provides a handhold during rotational control, and a nameplate 374 inscribed with the model name or control instructions.

The function component 370 is housed inside the collar 372, and the nameplate 374 is attached to the outer surface of the collar 372. There are a plurality of legs 375 on the back of the nameplate 374, these legs 375 are fitted into the collar 372, and screws 378 are threaded into the legs 375 from the back surface of the function component 370, which integrally assembles the function component 370, the collar 372, and the nameplate 374.

With this practical example, the function component 370, the collar 372, and the nameplate 374 can be manufactured from different materials and by different working methods, so suitable materials and working methods can be applied according to the various required characteristics and functions. In particular, if the surface finishes of the various members are made different, the product will be outstanding in terms of appearance and design. In specific terms, the function component 370 can be given a brush coating finish, the collar 372 a coating finish different from that of the function component 370, and the nameplate 374 a plating finish.

Alternative Arm Structures

Figure 16:
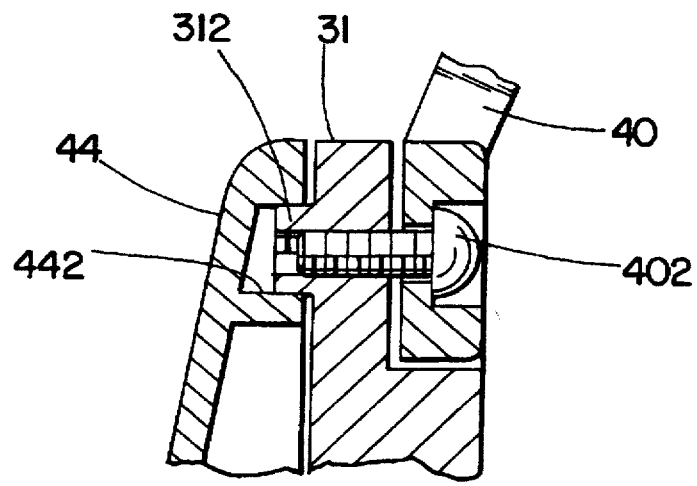
FIG. 16 is a cross section of the main components that illustrates another practical example of the attachment structure of the bale support members.

As shown in FIG. 16, the first bale support member 40, which has the line roller 41 (not shown), is swingably supported by a screw 402 on the tip of the first arm 31. That portion of the first arm 31 into which the screw 402 is threaded protrudes toward the cover 44 side and forms a protrusion 312. The protrusion 312 is fitted into a support hole 442 provided to the cover 44.

With this practical example, the fitting together of the protrusion 312 and the support hole 442 allows the first arm 31 to be integrally bound with the cover 44, so the rigidity of the first arm 31 can be raised. As a result, the first bale support member 40 and the first arm 31 can be prevented from falling over or distorting when a force is applied to these members. Further, the cover 44 can also be prevented from rising up from the first arm 31.

Figures 17A, 17B:
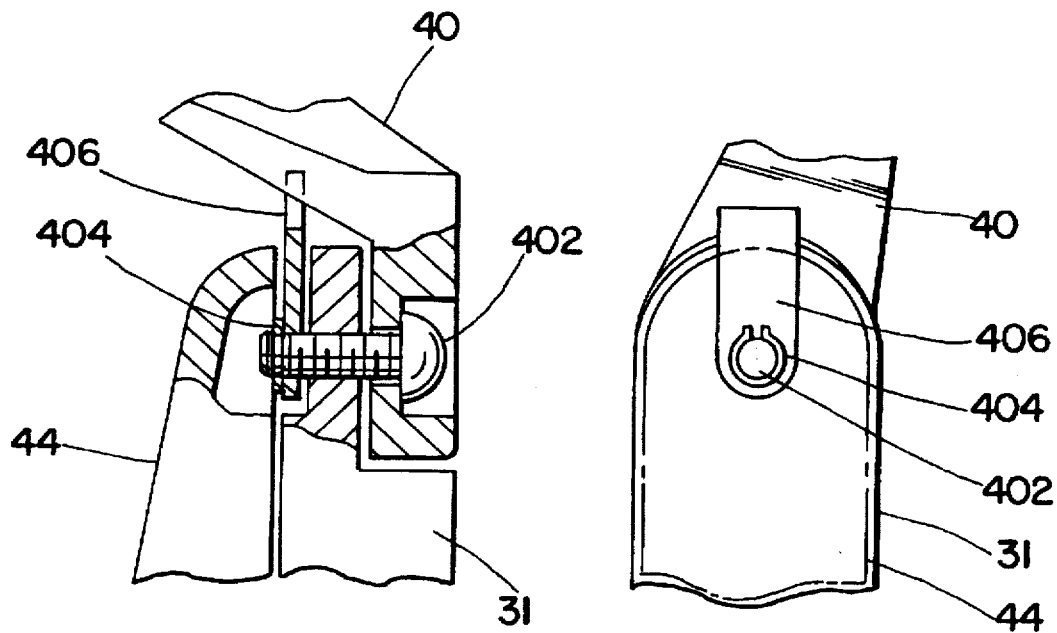
FIGS. 17(a) and 17(b) are a cross section of the main components and a side view that illustrate another preferred embodiment of the attachment structure of the bale support members.

As shown in FIG. 17, the first bale support member 40, which has the line roller 41 (not shown), is swingably supported by a screw 402 on the tip of the first arm 31, which is the same as in the above practical example. A line anti-tangle plate 406 is provided between the first arm 31 and the cover 44 from the screw 402 to the lower surface at the place where the first bale support member 40 extends out over and beyond the tip of the cover 44 and the first arm 31. An E-shaped stop ring 404 is mounted on the outside of the line anti-tangle plate 406 on the screw 402, and serves to retain the line anti-tangle plate 406. The line anti-tangle plate 406 is in the form of a thin plate, and swings along with the first bale support member 40.

With this practical example, the fishing line can be prevented by the line anti-tangle plate 406 from being pinched in the gaps between the various members the line enters between the first bale support member 40 and the first arm 31 and between the first bale support member 40 and the tip of the cover 44. When the fishing line tries to go between the first bale support member 40 and the first arm 31 or between the first bale support member 40 and the tip of the cover 44, it cannot work its way any deeper than the line anti-tangle plate 406.

In the above practical example, the shape and the attachment method of the line anti-tangle plate 406 can be modified in ways other than the structure shown in the figures. For instance, instead of using the E-shaped stop ring 404, it is also possible to fix the line anti-tangle plate 406 by threading it onto the screw 402.

Bale Inversion Mechanism

Figure 18:
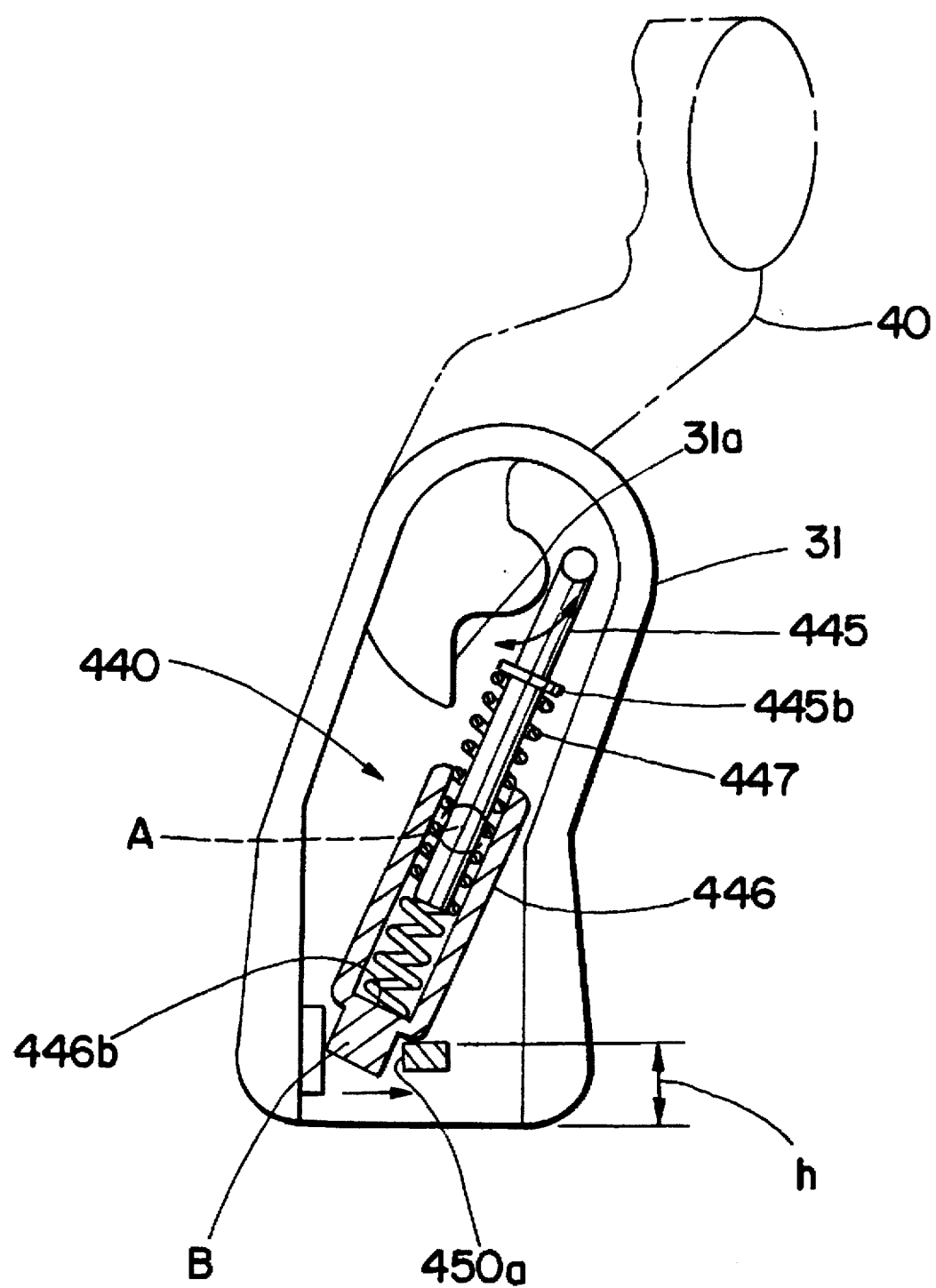
FIG. 18 is an internal structure diagram of the arm portion that illustrates another preferred embodiment of the bale inversion mechanism.
Figure 19:
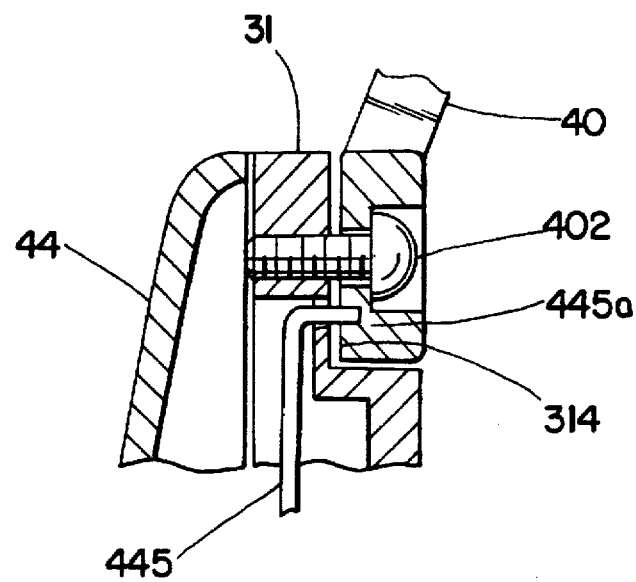
FIG. 19 is a cross section that illustrates the attachment portion of the bale support members in the embodiment in FIG. 18.
Figure 20:
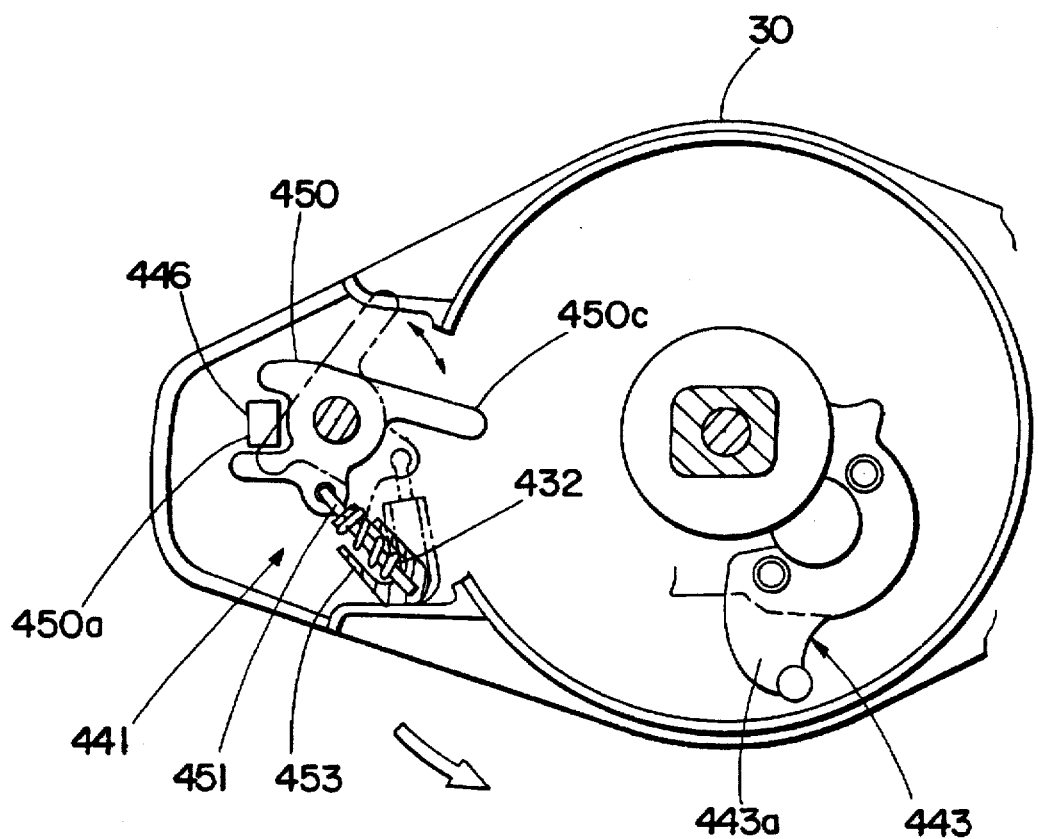
FIG. 20 is an internal structure diagram of the arm portion and rotor portion in the embodiment in FIG. 18.

As shown in FIGS. 18 through 20, the arms can be provided with a bale inversion mechanism. This bale inversion mechanism serves to invert the bale 43 and the bale support members 40 and 42 between the line release attitude and the line winding attitude, and also serves to maintain the inverted attitude.

First Toggle Mechanism

As shown in FIG. 18, the inside of the first arm 31 is equipped with a first toggle mechanism 440. This first toggle mechanism 440 has a rod 445 that extends along the axial direction of the first arm 31 and is supported by the first bale support member 40 at the tip side of the first arm 31, a cylindrical member 446 into which the rear end portion of the rod 445 is slidably inserted, and a spring 447 that is mounted between the rod 445 and the cylindrical member 446. There is a collar 445b at a point along the rod 445, and the spring 447 expands and contracts between the collar 445b and the floor 446b of the cylindrical member 446, and energizes the rod 445 and the cylindrical member 446 in the direction in which they mutually extend in the axial direction. The cylindrical member 446 is swingably supported on the inner wall of the first arm 31 around a swing center A.

As shown in FIG. 18, a stopper 31a is provided to the inner wall of the first arm 31 at the location where the tip side of the rod 445 supported by the first bale support member 40 hits when the first bale support member 40 rotates with respect to the first arm 31, and the first bale support member 40 cannot swing beyond this stopper 31a.

As shown in FIG. 19, the tip side of the rod 445 is bent at a right angle, and the tip 445a thereof is rotatably supported on the back of the first bale support member 40. The first bale support member 40 is positioned within a depression 314 formed with an L-shaped cross section in the tip of the first arm 31, and except for the portion through which the tip 445a of the above-mentioned rod passes, the back of the first bale support member 40 faces the front of the depression 314. With a structure such as this, when a force is applied to the first bale support member 40, the side and bottom surfaces of the depression 314 come into contact with the first bale support member 40 and are supported, which allows the inclination and distortion of the first bale support member 40 to be kept to a favorable minimum.

With the first toggle mechanism 440 having the above structure, the first bale support member 40 can be swung to a first position in which the rod 445 and the cylindrical member 446 are in the state shown in FIG. 18, and to a second position in which the tip side of the rod 445 hits the stopper 31a, the overall length of the rod 445 and the cylindrical member 446 contracts, and the lower end of the cylindrical member 446 moves to the right side in FIG. 18. The first position corresponds to the line winding attitude of the bale, and the second position corresponds to the line release attitude of the bale. When the bale 43 is swung, the rod 445 and the cylindrical member 446 are inverted between the first and second positions by the energizing force of the spring 447, and the inverted attitude is maintained elastically.

Second Toggle Mechanism

As shown in FIGS. 18 and 20, there is a second toggle mechanism 441 on the inside of a rotor 30 from the first arm 31 on the lower end side of the cylindrical member 446.

This second toggle mechanism 441 is equipped with a lever that is swingable in a plane parallel to the rotational plane of the rotor 30; a rod 451 that is engaged at one end with the lever 450; a cylindrical member 452 that is swingably supported, one end of which houses the rod 451 and the other end of which hits the inner wall of the rotor 30; and a spring 453 that is mounted between the rod 451 and the cylindrical member 452 and energizes the rod 451 and the cylindrical member 452 in the direction of overall length extension.

The lever 450 has an engagement notch 450a that hits the lower end of the cylindrical member 446 of the first toggle mechanism 440 inside the first arm 31, and a protrusion 450c that protrudes toward the rotational axis center on the inside of the rotor 30. As shown in FIG. 18, the engagement notch 450a of the lever 450 is positioned on the side near the rotational center B of the cylindrical member 446 at a height h from the lower end of the first arm 31 so that when the cylindrical member 446 of the first toggle mechanism 440 swings to either the left or the right, the engagement notch 450a will properly engage with the lower end portion of the cylindrical member 446.

When the cylindrical member 446 of the first toggle mechanism 440 swings to the left or right in the attitude inversion of the bale, the lever 450 of the second toggle mechanism 441 stopped by the cylindrical member 446 swings. When the lever 450 swings, the rod 451 and the cylindrical member 452 expand and contract and swing, as a result of which the lever 450 is inverted between the first position (indicated by the broken line in FIG. 20) and the second position (indicated by the solid line), and the inverted attitude is maintained. The above-mentioned first position corresponds to the first position of the first toggle mechanism 440, that is, to the line winding attitude of the bale, and the second position corresponds to the second position of the first toggle mechanism 440, or the line release attitude of the bale.

Therefore, the dual toggle mechanism comprising the first toggle mechanism 440 and the second toggle mechanism 441 can serve to effect bale inversion and to maintain the inverted state, and proper inversion operation is ensured.

Lever Switching Mechanism

As mentioned above, the bale is inverted when the bale 43 and the bale support members 40 and 42 are swung, but the inversion of the bale can also be accomplished by the rotation of the rotor 30, without direct operation of the bale 43 side.

As shown in FIG. 20, the reel body unit 2 has a switching member 443. This switching member 443 has a protrusion 443a that protrudes toward the inner wall around the outside of the rotor 30.

When the rotor 30 rotates, the protrusion 450c on the lever 450 of the second toggle mechanism 441 hits the protrusion 443a on the switching member 443 and is pushed, causing the lever 450 to swing. The time when the protrusion 450c on the lever 450 hits the protrusion 443a on the switching member 443 is when the lever 450 is in the above-mentioned second position (the solid line position in FIG. 20), and the protrusion 450c on the lever 450 does not hit the protrusion 443a of the switching member 443 in a state in which the lever 450 has moved to the first position (the broken line position in FIG. 20).

Therefore, when the bale is in the line release attitude, if the handle 1 is operated and the rotor 30 is rotated in the line winding direction, the protrusion 450c on the lever 450 of the second toggle mechanism 441 will hit the protrusion 443a on the switching member 443, and the lever 450 will swing such that it kicks up and will move from the above-mentioned second position to the first position. When the lever 450 moves from the second position to the first position, toggling is performed by the second toggle mechanism 441. Similar toggling is performed by the first toggle mechanism 440 that is engaged with the lever 450, and furthermore, the bale 43 and the first bale support member 40 by which the rod 445 of the first toggle mechanism 440 was stopped are inverted, which switches to the line winding attitude. Specifically, even if the line winding attitude is not achieved by the direct operation of the bale, if the fishing line is reeled in with the handle 1, then the bale is automatically inverted to the line winding attitude, which eliminates the need to invert the bale by hand.

Alternative Lever Switching Mechanisms

The structure of the switching member 443 here is different from that in the above practical example.

Figure 21:
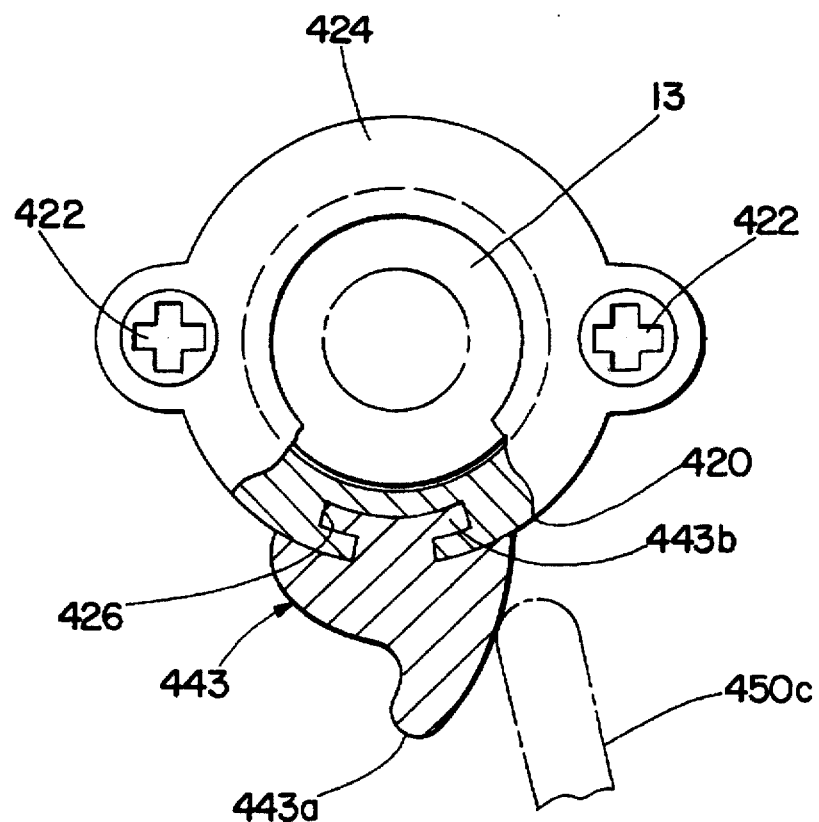
FIG. 21 is a plan view of a partial cross section that illustrates another preferred embodiment of the switching member.

As shown in FIG. 21, the lateral end face of the reel body unit 2 inside the rotor 30 is equipped with a bearing housing cylinder 420 that protrudes toward the inside of the rotor 30. The bearing housing cylinder 420 houses a roller bearing 13 that supports the above-mentioned pinion gear 12. The outer periphery of a ring-shaped bearing presser plate 424 is fixed by the tightening of screws 422 to the end face of the bearing housing cylinder 420, which positions the roller bearing 13.

Around the outside of the bearing housing cylinder 420 there is a T-shaped attachment groove 426 that is wider at the bottom. This attachment groove 426 engages with a T-shaped attachment protrusion 443b had by the switching member 443. When the bearing presser plate 424 is attached to the rear face of the of the bearing housing cylinder 420 in a state in which the attachment protrusion 443b of the switching member 443 is stopped by the attachment groove 426 of the bearing housing cylinder 420, then the attachment of the switching member 443 along with the roller bearing 13 is complete.

The switching member 443 is designed such that the lateral surface on the side that hits the protrusion 450c of the lever 450 is formed in a smooth curved surface, which allows the above-mentioned kicking up of the lever 450 to be carried out smoothly.

With this practical example, the attachment and removal of the switching member 443 can be performed simply.

Figure 22:
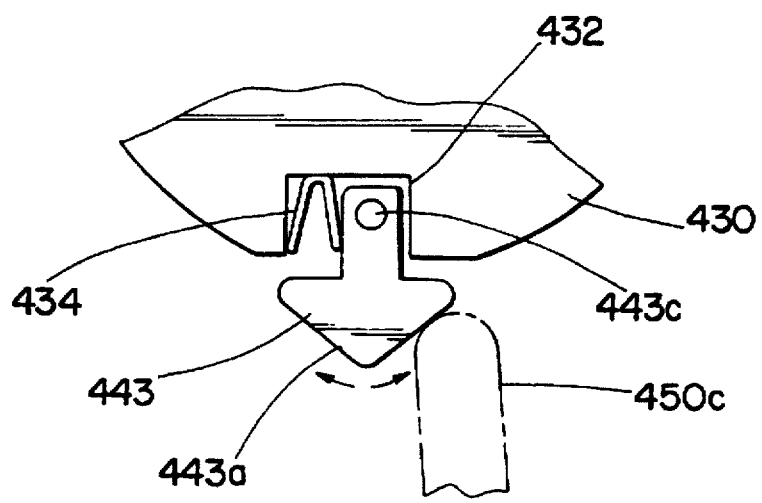
FIG. 22 is a plan view of the main components that illustrates another preferred embodiment of the switching member.

As shown in FIG. 22, an attachment component 430 protrudes from the lateral end face of the reel body unit 2 positioned inside the rotor 30. Around the outside of the attachment component 430 there is a housing indentation 432 for the switching member 443. The switching member 443 is in the form of an arrow, and the base end portion 443c is swingably supported inside the housing indentation 432. The pointed tip of the switching member 443 becomes the protrusion 443a, which hits the protrusion 450c of the lever 450. A roughly U-shaped plate spring 434 that is in contact with the side of the switching member 443 is positioned inside the housing indentation 432 to the lever 450 side of the switching member 443. This plate spring 434 energizes the switching member 443 toward the inner wall of the housing indentation 432.

As the rotor 30 rotates and the protrusion 450c of the lever 450 hits the protrusion 443a of the switching member 443, the lever 450 kicks up and its position is switched. At this point, the switching member 443 swings elastically against the energizing force of the plate spring 434, which softens the impact of collision between the protrusion 450c of the lever 450 and the protrusion 443a of the switching member 443. As a result, the generation of impact noise that would otherwise accompany the switching is prevented, and the wear or damage to the protrusion 450c or the protrusion 443a that would be caused by impact contact is also prevented.

As long as the switching member 443 can be elastically deformed, an elastic deformation mechanism from any of a variety of ordinary mechanical devices can be applied in addition to the structure in the above practical example.

Other Preferred Embodiments

In addition to those in the illustrated practical examples, the shape of the second cover unit (e.g., the flange-shaped cover 210) and the first cover unit (e.g., the cover unit 200) that make up the cover for the opening 2h can be modified as needed according to the overall structure of the spinning reel.

The construction of the various mechanisms and members of the spinning reel, excluding the structure pertaining to the first cover unit (cover unit 200) and the second cover unit (flange-shaped cover 210), can be freely implemented in combination with the construction of ordinary spinning reels in addition to that given in the various practical examples above.

When the flange-shaped cover 210 (or generally, the second cover unit) is attached to the reel body unit 2 in a retracted state, the place where the flange-shaped cover 210 is positioned in the retracted state may be anywhere in the reel body unit 2 as long as the place does not interfere with the removal of the master gear 11. In addition to the above-mentioned internal space side of the rotor 3, any place in the outer space of the rotor 3 to the side of the body 2a or in the opening 2h can be employed as long as it does not interfere with the removal of the master gear 11.

In addition to the above-mentioned sliding mechanism involving the sliding protrusion 211 and the revolution mechanism involving the revolving pins 241 and 243, various movement mechanisms from ordinary mechanism members can also be applied as the movement mechanism that moves the flange-shaped cover 210 from its specified attachment state to its retracted state.

In addition to the above-mentioned fastening structure involving the screw 217 or the structure in which the cover unit 200 is used for pressing, a fixing means involving various clamps or a fixing means involving a male-female fitting can also be employed as the means for fixing the flange-shaped cover 210 in its specified attachment state.

In the removal or movement of the flange-shaped cover 210 between its retracted state and its specified attachment state, the flange-shaped cover 210 will be easier to handle if grip pieces for holding the flange-shaped cover 210 are provided to part of the flange-shaped cover 210. These grip pieces are provided to a place where they will not interfere with the removal of the master gear 11 or the cover unit 200.

What is claimed is:

1. A spinning reel comprising
   (a) a reel body unit that has a side in which an opening is defined and that is mounted on a fishing rod;
   (b) a handle shaft that is rotatably supported on said reel body unit;
   (c) a spool that is reciprocatably supported on said reel body unit;
   (d) a rotor that is rotatably supported on said reel body unit, guides a fishing line to the outer periphery of said spool, and overlaps a part of said opening in said reel body unit;
   (e) a master gear that is housed in said reel body unit, is fixed to said handle shaft and rotates said rotor, and is removable from said opening of said reel body unit;
   (f) a cover unit that blocks a part of said opening in said reel body unit without being overlapped by said rotor, rotatably supports one end of said handle shaft, and is removable from said opening; and
   (g) a flange-shaped cover that blocks the remaining part of said opening not blocked by said cover unit, and is movable to a non-blocking position which permits said master gear to be removed from said opening.

2. A spinning reel as defined in claim 1 wherein said flange-shaped cover is removable from said reel body unit.

3. A spinning reel as defined in claim 2 wherein
   said flange-shaped cover engages with said reel body unit at a position in which it partially blocks said opening and is slidably removable from said position; and
   said reel further comprises fixing means for fixing said flange-shaped cover by blocking said opening with said cover unit after said opening is partially blocked with said flange-shaped cover.

4. A spinning reel as defined in claim 3 wherein said fixing means comprises a fixing piece provided to said flange-shaped cover and protruding toward said opening, a fixing hole defined in said fixing piece; and a fixing pin provided to said cover unit and adapted to fit into said fixing hole.

5. A spinning reel as defined in claim 1 wherein said flange-shaped cover is stopped by said reel body unit in said non-blocking position.

6. A spinning reel as defined in claim 5 wherein
   said flange-shaped cover is retractable from said opening and engages with said reel body unit such that revolves about a first point on the periphery of said opening between a retracted position and a position in which it partially blocks said opening, and said reel further comprises stopping means for stopping said flange-shaped cover on said reel body unit upon revolving motion of said flange-shaped cover toward said opening.

7. A spinning reel as defined in claim 6 wherein said reel body unit has defined therein a revolution hole at said first point on the periphery of said opening, said revolution hole defining an axis of rotation of said flange-shaped cover, and said flange-shaped cover has a first end that is provided with a pin adapted to fit into said revolution hole.

8. A spinning reel as defined in claim 7 wherein said stopping means comprises a stationary hole defined in said reel body unit at a second point on the periphery of said opening and said flange-shaped cover has a second end that is provided with a stationary pin adapted to fit into said stationary hole.

9. A spinning reel as defined in claim 7 wherein said flange-shaped cover has a second end that is provided with a stationary piece having a fixing hole defined therein and said cover unit is provided with a fixing pin adapted to fit into said fixing hole.

10. A spinning reel as defined in claim 7 wherein said flange-shaped cover is movable in the direction of said axis of rotation.

11. A spinning reel comprising
(a) a reel body unit having an opening;
(b) a handle shaft that is rotatably supported on said reel body unit;
(c) a spool that is reciprocatably supported on said reel body unit;
(d) a rotor that is rotatably supported on said reel body unit and overlaps a part of said opening in said reel body unit;
(e) a master gear that is housed in said reel body unit, is fixed to said handle shaft and rotates said rotor, and is removable from said opening of said reel body unit;
(f) a first cover unit that blocks a part of said opening in said reel body unit without being overlapped by said rotor, rotatably supports one end of said handle shaft, and is removable from said opening; and
(g) a second cover unit that blocks the remaining part of said opening not blocked by said cover unit, and is movable to a non-blocking position which permits said master gear to be removed from said opening.

12. A spinning reel as defined in claim 11 wherein said rotor has defined therein an inner space and said second cover unit is disposed at least partially within said inner space.

13. A spinning reel as defined in claim 11 wherein said second cover unit is removable from said reel body unit.

14. A spinning reel as defined in claim 11 wherein said reel body unit comprises a mounting ledge adjacent said opening, said second cover unit engages with said reel body unit at a position in which it partially blocks said opening and is slidably removable from said position, and said reel further comprises fixing means for fixing means for fixing said second cover unit in said position in which it partially blocks said opening.

15. A spinning reel as defined in claim 14 wherein said mounting ledge has defined therein a sliding groove.

16. A spinning reel as defined in claim 15 wherein
said sliding groove extends toward and opens into said opening, and said fixing means comprises a fixing piece provided to said second cover unit and protruding toward said opening, said fixing piece comprises a sliding protrusion that fits into said sliding groove, a fixing hole defined in said fixing piece, and a fixing pin that is provided to said cover unit and that fits into said fixing hole.

17. A spinning reel as defined in claim 16 wherein
said sliding groove extends toward but does not open into said opening, and said fixing means comprises a fixing piece provided to said flange-shaped cover and protruding toward said opening, said fixing piece comprising a sliding protrusion that fits into said sliding groove, a fixing hole defined in said fixing piece, and means for fixing said fixing piece to said reel body unit by fitting into said fixing hole.

18. A spinning reel as defined in claim 17 wherein said means for fixing said fixing piece to said reel body unit is a screw.

19. A spinning reel as defined in claim 18 wherein
said second cover unit is retractable from said opening and is revolvably engaged with said reel body unit for revolving motion about a first point on the periphery of said opening to move between a retracted position and a position in which it partially blocks said opening, and said reel further comprises stopping means for stopping said second cover unit on said reel body unit upon revolving motion of said second cover unit toward said opening.

20. A spinning reel as defined in claim 19 wherein said reel body unit has defined therein a revolution hole at said first point on the periphery of said opening, said revolution hole defining an axis of rotation of said second cover unit, and said second cover unit has a first end that is provided with a pin that fits into said revolution hole.

21. A spinning reel as defined in claim 20 wherein said stopping means comprises a stationary hole defined in said reel body unit at a second point on the periphery of said opening and said second cover unit has a second end that is provided with a stationary pin that fits into said stationary hole.

22. A spinning reel as defined in claim 20 wherein said second cover unit has a second end that is provided with a stationary piece having a fixing hole defined therein and said first cover unit is provided with a fixing pin that fits into said fixing hole.

23. A spinning reel as defined in claim 20 wherein said second cover unit is movable in the direction of said axis of rotation.

24. A spinning reel as defined in claim 11 wherein said second cover unit is flange-shaped.

25. A method for removing a master gear from a spinning reel that comprises a reel body unit having an opening, a rotor that overlaps a part of said opening in said reel body unit, a master gear that is removable from said opening of said reel body unit, a first cover unit that blocks a part of said opening in said reel body unit without overlapping with said rotor and is removable from said opening, and a second cover unit that blocks the remaining part of said opening not blocked by said first cover unit, and is movable to a non-blocking position which permits said master gear to be removed from said opening, said method comprising the steps of:

(i) removing said first cover unit from said reel;

(ii) moving said second cover unit to said non-blocking position; and (iii) removing said master gear from said reel body unit through said opening.

26. The method of claim 25 wherein in step (ii) said second cover unit is slidingly moved toward said opening and removed from said reel.

27. The method of claim 25 wherein in step (ii) said second cover unit is retracted to a non-blocking position.

28. A method for making a spinning reel comprising a reel body unit having an opening, a rotor that overlaps a part of said opening in said reel body unit, and a master gear, said method comprising the step of blocking said opening of said reel body unit by fixing to said reel body unit (i) a first cover unit that blocks a part of said opening in said reel body unit without overlapping with said rotor and is removable from said opening and (ii) a second cover unit that blocks the remaining part of said opening not blocked by said first cover unit, and is movable to a non-blocking position which permits said master gear to be removed from said opening, wherein said second cover unit is fixed to said reel body unit prior to fixing said first cover unit to said reel body unit.

* * * * *